(12) United States Patent
Addiego et al.

(10) Patent No.: US 7,928,029 B2
(45) Date of Patent: *Apr. 19, 2011

(54) REFRACTORY CERAMIC COMPOSITE AND METHOD OF MAKING

(75) Inventors: William Peter Addiego, Big Flats, NY (US); Christopher Raymond Glose, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/708,213

(22) Filed: Feb. 20, 2007

(65) Prior Publication Data

US 2008/0196449 A1    Aug. 21, 2008

(51) Int. Cl.
  *C04B 35/49*    (2006.01)
(52) U.S. Cl. .......................... 501/106; 65/17.3; 423/326
(58) Field of Classification Search .................. 501/106; 65/17.3; 423/326
  See application file for complete search history.

(56) References Cited

U.S. PATENT DOCUMENTS

| | | | | |
|---|---|---|---|---|
| 2,911,311 A | | 11/1959 | Feagin et al. | |
| 3,285,757 A | * | 11/1966 | Cornely | 501/103 |
| 3,338,696 A | | 8/1967 | Dockerty | 65/145 |
| 3,437,470 A | | 4/1969 | Overman | 65/195 |
| 3,682,609 A | | 8/1972 | Dockerty | 65/83 |
| 4,057,227 A | | 11/1977 | Cruff et al. | 366/2 |
| 4,961,778 A | | 10/1990 | Pyzik et al. | 75/230 |
| 5,478,538 A | * | 12/1995 | Hollitt et al. | 423/2 |
| 5,508,242 A | | 4/1996 | Baumard et al. | 501/152 |
| 6,284,692 B1 | * | 9/2001 | Jue et al. | 501/103 |
| 6,794,786 B2 | | 9/2004 | Enomoto et al. | 310/218 |
| 7,000,679 B2 | | 2/2006 | Takahashi et al. | 164/508 |
| 7,704,905 B2 | * | 4/2010 | Addiego et al. | 501/106 |
| 2003/0035907 A1 | * | 2/2003 | Campbell et al. | 428/26 |
| 2004/0055338 A1 | * | 3/2004 | Helfinstine et al. | 65/374.13 |
| 2005/0014031 A1 | | 1/2005 | Hiramatsu et al. | 428/698 |
| 2005/0130830 A1 | | 6/2005 | Ames et al. | 110/347 |
| 2008/0125307 A1 | * | 5/2008 | Lu et al. | 501/103 |

FOREIGN PATENT DOCUMENTS

| | | |
|---|---|---|
| JP | 11-246230 | 9/1999 |
| SU | 1020404 * | 5/1983 |
| WO | WO 84/00030 | 1/1984 |

OTHER PUBLICATIONS

Marino, O.; Pernice, P.; Mascolo, "The Effect of Addition of Ball Clay and Wollastonite on Properties of Sintered Zircon", G. Dip. Ing. Mater. Prod., Univ. Napoli, Naples, Italy. Materials Chemistry and Physics (1989), Volume Date 1988, 23(4), 416-21.
McKee, J.H.; Adams, A.M. "The Physical Properties of Extruded and Slip-Cast Zircon With Particular Reference to Thermal Shock Resistance", Transactions of the British Ceramic Society (1950)m 49 386-407.

* cited by examiner

*Primary Examiner* — Jessica L Ward
*Assistant Examiner* — Nicholas P D'Aniello
(74) *Attorney, Agent, or Firm* — Siwen Chen

(57) ABSTRACT

A zircon composition having a multi-modal particle size distribution is disclosed. The multi-modal zircon composition comprises greater than about 40 parts by weight of a coarse zircon component having a median particle size of from greater than about 3 μm to about 25 μm, and less than about 60 parts by weight of a fine zircon component having a median particle size of 3 μm or less. Methods for manufacturing a green body and a fired refractory ceramic body comprising the multi-modal zircon composition are also disclosed.

12 Claims, 3 Drawing Sheets

REFRACTORY CERAMIC COMPOSITE AND METHOD OF MAKING

BACKGROUND OF THE INVENTION

1. Field of the Invention

The present invention relates to refractory ceramic materials and the use of such materials in the manufacture of sheet glass by the fusion process.

2. Technical Background

The fusion process is one of the basic techniques used to produce sheet glass and can produce sheet glass having surfaces with superior flatness and smoothness relative to sheet glass produced by alternative processes, such as for example, the float and slot drawn processes. As a result, the fusion process has found advantageous use in the production of the glass substrates used in the manufacture of light emitting displays, such as liquid crystal displays (LCDs).

The fusion process, specifically, the overflow downdraw fusion process, includes a supply pipe which provides molten glass to a collection trough formed in a refractory body known as an isopipe. During the overflow downdraw fusion process, molten glass passes from the supply pipe to the trough and then overflows the top of the trough on both sides, thus forming two sheets of glass that flow downward and then inward along the outer surfaces of the isopipe. The two sheets meet at the bottom or root of the isopipe, where they fuse together into a single sheet. The single sheet is then fed to drawing equipment that controls the thickness of the sheet by the rate at which the sheet is drawn away from the root. The drawing equipment is located well downstream of the root so that the single sheet has cooled and become rigid before coming into contact with the equipment.

The outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

The dimensional stability of an isopipe during the glass forming process can affect the overall success of the manufacturing process, as well as the properties of the manufactured glass sheet. In the overflow downdraw fusion process, an isopipe can be subjected to temperatures of about 1,000° C. While exposed to these temperatures, an isopipe must support its own weight, the weight of the molten glass contained within the isopipe and overflowing its sides, and at least some tensional force that is transferred back to the isopipe through the fused glass as it is being drawn.

Commercial and market factors require a continuous increase in the size of light emitting displays and thus, the size of sheet glass. Depending on the width of the sheet glass to be produced, an isopipe can have an unsupported length of about 1.5 meters or more.

To withstand these demanding conditions, isopipes have conventionally been manufactured from isostatically pressed blocks of refractory material (hence the name "iso-pipe"). In particular, isostatically pressed zircon refractories have been used to form isopipes for the fusion process. Conventional zircon refractories are comprised of $ZrO_2$ and $SiO_2$, or equivalently $ZrSiO_4$, and sintering additives. Even with such high performance materials, isopipe materials can creep, resulting in dimensional changes which limit their useful life. In particular, isopipes exhibit sag such that the middle of the unsupported length of the pipe drops below the height of its outer supported ends.

Thus, there is a need to address dimensional stability and other shortcomings associated with conventional isopipes and methods for manufacturing sheet glass. These needs and other needs are satisfied by the composition and methods of the present invention.

SUMMARY OF THE INVENTION

The present invention relates to a refractory ceramic material that can, in one aspect, be used in the manufacture of sheet glass by, for example, the overflow downdraw fusion process, and specifically to an isopipe designed to control sag during use. The present invention addresses at least a portion of the problems described above through the use of a novel refractory ceramic composition and method of making.

In a first aspect, the present invention provides a composition comprising zircon, wherein the zircon has a multi-modal particle size distribution comprising: a) greater than about 40 parts by weight of a coarse zircon component, and b) less than about 60 parts by weight of a fine zircon component, wherein the coarse zircon component has a median particle size of from greater than 3 μm to about 25 μm, and wherein the fine zircon component has a median particle size of 3 μm or less.

In a second aspect, the present invention provides a method of making a green body comprising providing a composition comprising a multi-modal zircon particle size distribution, wherein the composition comprises: a) greater than about 40 parts by weight of a coarse zircon component, and b) less than about 60 parts by weight of a fine zircon component, wherein the coarse zircon component has a median particle size of from about 3 μm to about 25 μm, and wherein the fine zircon component has a median particle size of less than about 3 μm; and then forming the composition into a desired shape.

In a third aspect, the present invention provides an article made by the method described above.

Additional aspects and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the present invention and together with the description, serve to explain, without limitation, the principles of the invention. Like numbers represent the same elements throughout the figures.

DETAILED DESCRIPTION OF THE INVENTION

Figure 1:
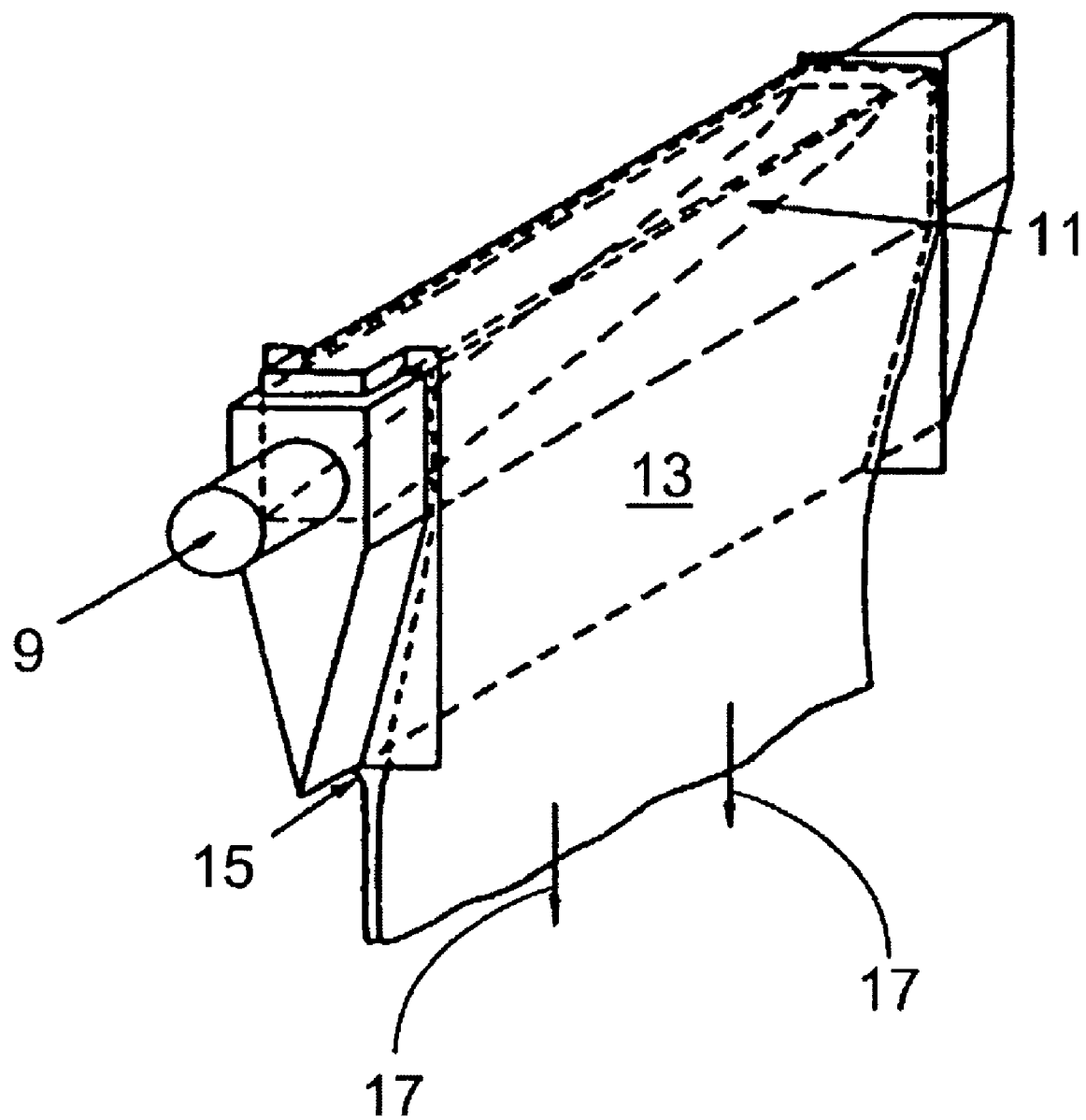
FIG. 1 is a schematic diagram illustrating a representative construction for an isopipe for use in an overflow downdraw fusion process for making sheet glass, in accordance with one aspect of the present invention.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known aspects. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination aspect, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes aspects having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the description includes both aspects of the invention including and excluding the component.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

References in the specification and concluding claims to parts by weight, of a particular component in a composition or article, denote the weight relationship between the component and any other components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein, the term "isopipe" refers to any sheet forming delivery system used in a fusion process which produces flat glass wherein at least a part of the delivery system comes into contact with the glass just prior to fusion, irrespective of the configuration or the number of components making up the delivery system.

As used herein, the term "pore" or "pores" refers to a vacancy or void within and/or between grains of a refractory material. The term "pore" is intended to describe vacancies and/or voids of varying sizes, but is not intended to describe inter-atomic spaces within a material.

The following U.S. patents and published applications describe various compositions and methods for manufacturing sheet glass, and they are hereby incorporated by reference in their entirety and for the specific purpose of disclosing materials and methods relating to the formation of refractory ceramics, isopipes, and the manufacture of sheet glass: U.S. Pat. Nos. 3,338,696; 3,682,609; 3,437,470; 6,794,786; and Japanese Patent Publication No. 11-246230.

As briefly introduced above, the present invention provides a method for manufacturing an improved refractory ceramic body that, for example, can be useful as an isopipe in the manufacture of sheet glass. Specifically, the present invention provides an improved zircon composition and an isopipe formed from the inventive zircon composition. The isopipe of the present invention can have enhanced dimensional stability and longevity over conventional isopipes used in the manufacture of sheet glass.

Although the compositions, refractory bodies, and methods of the present invention are described below with respect to the manufacture of isopipes and sheet glass, it should be understood that the same or similar compositions and methods can be used in other applications where dimensionally stable refractory materials are required. Accordingly, the present invention should not be construed in a limited manner.

With reference to the drawings, FIG. 1 illustrates a schematic of an isopipe, typical of those used in the manufacture of sheet glass by, for example, the overflow downdraw fusion process. A conventional isopipe and sheet glass manufacturing system comprises a supply pipe 9 that provides molten glass to a collection trough 11 formed in a refractory body 13 known as an isopipe. During operation, molten glass can flow from the supply pipe to the trough where it can overflow the top of the trough of both sides, forming two sheets of glass that flow downward and then inward along the outer surfaces of the isopipe. The two sheets meet at the bottom or root 15 of the isopipe where they can fuse together into a single sheet. The single sheet is then fed to drawing equipment (represented by arrows 17), which controls the rate at which the sheet is drawn away from the root, and thus, the thickness of the sheet. The drawing equipment is typically positioned downstream of the root such that the formed sheet glass has sufficiently cooled and become rigid before contacting the equipment.

Conventional isopipes can be comprised of preformed, commercially available zircon materials (Ferro Corporation, Penn Yan, N.Y., USA). Commercially available zircon materials can be classified by particle size and utilized to form an isopipe. The conventional zircon material can be formed into a desired shape, such as an isopipe, and fired, producing a polycrystalline refractory ceramic body. A challenge in the formation of such a refractory ceramic body is achieving a dense structure that is resistant to creep. Creep, as used herein, refers to the tendency of a material to move or to deform to relieve a stress. Such deformation can occur as a result of long-term exposure to levels of stress that are below the yield or ultimate strength of the material and can be greater in materials that are subjected to heat for long periods of time. Lowering the creep rate of a refractory material such as, for example, an isopipe, can result in less sag during use. Creep rate can accelerate in low density or high grain-boundary refractory materials, such as those having large amounts pores located at grain boundaries and/or triple points.

Creep can occur in various forms, such as Nabarro-Herring creep (stress driven bulk diffusion within grains) and/or Cobble creep (grain-boundary diffusion). Not wishing to be bound by theory, Nabarro-Herring creep can be related to the concentration and size of pores within a material, such as within and/or between grains of a ceramic, and can be proportional to grain size. A reduction in the concentration and/or size of pores between grains of a ceramic material can result in increased bulk density and increased creep resistance. Similarly, Cobble creep can be related to mass transport phenomena occurring along grain boundaries of a polycrystalline material, and can also be inversely related to grain size.

Conventional zircon refractory ceramics comprise zircon materials having large grain sizes so as to minimize grain boundaries, and thus Cobble creep. Use of zircon materials having a larger grain size can reduce the effects of Cobble creep, but can simultaneously result in an increase in the concentration and size of pores within the refractory body. Such an increase in the concentration and size of pores can result in decreased bulk density and decreased strength of an isopipe.

Conventional isopipes are typically prepared using zircon materials having a particle size of from about 1 μm to about 30 μm and can include substantial pores within their structure. Sintering aids are typically required for forming and firing isopipes from conventional zircon materials.

The present invention provides a zircon composition having a multi-modal particle size distribution and a method for manufacturing a refractory ceramic composite that is more resistant to creep and resulting sag than conventional zircon materials. Zircon compositions having multi-modal particle size distributions in accordance with the present invention can provide refractory ceramic materials exhibiting fewer and/or smaller pores, higher bulk densities, and higher strength.

Multi-Modal Particle Size Distribution

The zircon composition of the present invention comprises at least a binary particle size distribution, for example, a binary, a ternary, or higher order particle size distribution. Each mode of a particle size distribution can have a median particle size. Further, the distributions of each mode can overlap with the distributions of one or more other modes. For example, a binary composition can comprise two modes, wherein the first and second modes have median particle sizes of about 2 μm and about 15 μm, respectively. The distribution, or range of individual particle sizes, of each mode can overlap. The zircon composition of the present invention can comprise a coarse particle size component and a fine particle size component. The median particle sizes and amounts of each component can vary depending upon the desired porosity, bulk density, and strength of a refractory ceramic article made from the composition.

In one aspect, the composition of the present invention comprises a binary particle size distribution comprising greater than about 40 parts by weight of a coarse zircon component having a median particle size of from greater than 3 μm to about 25 μm, and less than about 60 parts by weight of a fine zircon component having a median particle size of 3 μm or less.

The coarse zircon component of the present invention can comprise from greater than 40 to less than about 100 parts by weight, for example, about 40.1, 41, 42, 45, 50, 60, 70, 80, 90, 95, or 99 parts by weight, relative to the other modes, of the binary zircon composition. It is preferable that the coarse zircon component comprise from about 40 to about 80, for example, about 40, 42, 44, 48, 50, 52, 55, 58, 60, 63, 65, 70, 75, 78, 79, or 80 parts by weight, more preferably from about 40 to about 60, for example, about 40, 42, 44, 48, 50, 52, 55, 58, or 60 parts by weight of the binary zircon composition. The coarse zircon component can have a median particle size of from greater than about 3 μm to about 25 μm, for example, about 3.1, 3.4, 4, 5, 8, 10, 14, 17, 20, 23, 24, or 25 μm. It is preferable that the median particle size of the coarse zircon component be from greater than about 3 μm to about 10 μm, for example, about 3.01, 3.2, 3.4, 3.6, 3.8, 4, 5, 6, 7, 8, 9, 9.5, 9.9, or 10 μm, more preferably from greater than about 5 μm to about 9 μm, for example, about 5.01, 5.2, 5.4, 5.6, 5.8, 6, 6.5, 6.8, 7.0, 7.4, 7.8, 8, 8.4, 8.8, or 9 μm.

The fine zircon component of the present invention can comprise from greater than 0 to less than about 60 weight parts by weight, for example, about 0.1, 0.5, 1, 2, 5, 10, 20, 30, 40 50, 55, or 59.5 parts by weight, relative to the other modes, of the binary zircon composition. It is preferable that the fine zircon component comprise from about 30 to about 60 parts by weight, for example, about 30, 30.5, 31, 33, 35, 38, 40, 42, 44, 46, 48, 50, 52, 54, 56, 58, 59, 59.5, or 60 parts by weight, more preferably from about 40 to about 60, for example, about 40, 40.5, 42, 44, 46, 48, 50, 52, 54, 56, 58, 59, 59.5, or 60 parts by weight of the binary zircon composition. The fine zircon component of the present invention can have a median particle size of about 3 μm or less, for example, about 3, 2.8, 2.8, 2.5, 2.1, 1.8, 1.5, 1.3, 1.0, or 0.9 μm. It is preferable that the median particle size of the fine zircon component be from about 0.5 to about 2.5 μm, for example, about 0.5, 0.7, 0.9, 1.1, 1.3, 1.5, 1.7, 1.9, 2.1, 2.3, or 2.5 μm, more preferably from about 0.5 to about 1.5 μm, for example about 0.5, 0.7, 0.9, 1.1, 1.3, or 1.5 μm.

The particle size ratio of the coarse zircon component to the fine zircon component can be any such ratio provided by the particle sizes listed herein. It is preferable that the particle size ratio of the coarse zircon component to the fine zircon component be from about 5:1 to about 15:1, for example, about 5:1, 7:1, 9:1, 10:1, 12:1, 14:1, or 15:1, more preferably from about 5:1 to about 11:1, for example, about 5:1, 6:1, 6.5:1, 7:1, 7.5:1, 8:1, 8.5:1, 9:1, 9.5:1, 10:1, 10.5:1, or 11:1.

In one aspect, the binary zircon composition comprises coarse and fine zircon components having median particle sizes of about 20 μm and about 2 μm, respectively. In this aspect, the coarse and fine zircon components comprise about 90 and about 10 parts by weight, respectively, of the binary zircon composition.

In another aspect, the binary zircon composition comprises coarse and fine zircon components having median particle sizes of about 20 μm and about 2 μm, respectively. In this aspect, the coarse and fine zircon components comprise about 80 and about 20 parts by weight, respectively, of the binary zircon composition.

In another aspect, the binary zircon composition comprises coarse and fine zircon components having median particle sizes of about 7 μm and about 1 μm, respectively. In this aspect, the coarse and fine zircon components comprise about 70 and about 30 parts by weight, respectively, of the binary zircon composition.

In yet another aspect, the binary zircon composition comprises coarse and fine zircon components having median particle sizes of about 7 μm and about 1 μm, respectively. In this aspect, the coarse and fine zircon components each comprise about 50 parts by weight of the binary zircon composition.

The zircon composition of the present invention can comprise more than two modes, such as for example, 3 (ternary) or 4 (quaternary) modes. In one aspect, the composition of the present invention comprises a ternary particle size distribution having a coarse, a medium, and a fine particle size zircon component. In this aspect, the coarse zircon component has a median particle size greater than about 15 μm, for example, about 15.1, 15.5, 16, 18, 20, 21, 22, 24, or 25 μm; the medium zircon component has a median particle size of from about 3 to about 15 μm, for example, about 3, 3.5, 4, 5, 7, 9, 11, 13, 14, or 15 μm; and the fine zircon component has a median particle size of less than about 3 μm, for example, about 2.9, 2.8, 2.8, 2.5, 2.1, 1.8, 1.5, 1.3, 1.0, or 0.9 μm. In ternary or higher order zircon compositions, the relative parts by weight of each component can vary depending upon the morphology of the zircon particles.

The distribution of particle sizes within each component is not required to be uniform. For example, a ternary zircon composition can comprise a coarse, a medium, and a fine particle size zircon component. The coarse zircon component can comprise a distribution wherein about 90 wt. % of the coarse component has a particle size from greater than about 15 μm to about 25 μm, and wherein about 10 wt. % of the coarse component has a particle size greater than about 25 μm. The fine zircon component can comprise a distribution wherein about 90 wt. % of the fine zircon component has a particle size from greater than about 0.8 μm to about 1.6 μm, and wherein about 10 wt. % of the fine zircon component has a particle size greater than about 1.6 μm.

In another aspect, the zircon composition of the present invention comprises a continuous distribution, wherein multiple modes result in a distribution that is substantially uniform. In such a continuous distribution composition, it is possible that individual modes can be difficult to differentiate. A continuous distribution can comprise particles of substantially all sizes less than or equal to, a particular value, such as, for example, 25 μm, wherein the volume contributions of the particles can result in an efficiently packed mixture. A continuous distribution can be defined as substantially all particle sizes within a ±2 μm tolerance, preferably within a ±1 μm tolerance, bound at one perimeter, such as, for example, less than, less than or equal to, greater than, or greater than or equal to a particular nominal particle size. In an exemplary aspect, a continuous distribution comprises substantially all particle size less than about 25 μm, for example, about 1, 2, 3, 4, 5, 6, 7, 8, 9, 10, 11, 12, 13, 14, 15, 16, 17, 18, 19, 20, 21, 22, 23, and 24 μm, wherein the volume contributions of the particles result in an efficiently packed mixture.

Zircon Components

Individual zircon components can be purchased commercially (Ferro Corporation, Penn Yan, N.Y., USA) or prepared from other zircon materials by, for example, grinding a commercially available zircon material to a target median particle size. Such zircon components can be ground by any method suitable for providing the desired median particle size and distribution. In one aspect, a commercially available zircon material is ball-milled with yttria-stabilized zirconia grinding media to a desired median particle size. Components can be further ground, if required, by wet-grinding in a solvent, such as, for example, methanol.

The particle size distribution of a zircon component can vary depending upon the type and extent of grinding. For example, moderate grinding to a median particle size greater than about 2 μm can provide a broad particle size distribution, whereas grinding to a median particle size of about 1 μm can provide a narrow particle size distribution.

A zircon material can also be classified and/or separated into one or more particle size fractions by, for example, sieving a ground zircon component. Grinding and particle sizing techniques are known and one of skill in the art could readily select an appropriate zircon material and grinding technique.

Multi-Modal Zircon Composition

The components of the zircon composition of the present invention can be mixed by any suitable method, such as, for example, dry blending. It is preferable that the components of the zircon composition be uniformly or substantially uniformly mixed. Uniform mixtures of multiple zircon components can provide ceramic articles having higher bulk densities and greater strength. Such uniform mixtures can be achieved using conventional mixing and dispersion techniques. Mixing and/or dispersion of zircon components can be performed by, for example, a high shear mixer such as a ball mill, an attrition mill, and/or a hammer mill. An exemplary mixing process can be performed with a Processall® mixer, available from Processall Incorporated, Cincinnati, Ohio, USA. A high shear mixer, such as a Processall mixer, is preferred in order to obtain a homogeneous blend of zircon components. In one aspect, the multiple zircon components are mixed to provide a substantially homogeneous mixture. Such a homogeneous mixture can comprise a uniform or substantially uniform distribution of, for example, coarse, medium, and fine particles. Various mixing and dispersion techniques are known in the ceramics and fine particle industry and one of skill in the art could readily select an appropriate mixing and/or dispersion technique.

The multi-modal zircon composition of the present invention can reduce or eliminate the need for sintering aids typically used with conventional zircon materials. In one aspect, the multi-modal zircon composition is free of or substantially free of sintering aids. In this aspect, the composition comprises less than about 3 wt. %, preferably less than about 1 wt. %, more preferably less than about 0.1 wt. %, and most preferably is free of sintering aids.

In another aspect, the composition can comprise at least one sintering aid. Such sintering aids can comprise any material capable of mineralizing zircon, such as, for example, oxides of titanium, iron, calcium, yttrium, niobium, neodymium, glass compounds, or a combination thereof. A sintering aid can also comprise a zircon material having a median particle size less than about 2 µm. A zircon sintering aid can be the same or different from the fine zircon component of the multi-modal zircon particle size distribution. A sintering aid, when present, can be added in any suitable amount, such as for example, from about 0.1 to about 5 wt. %, or 0.1, 0.2, 0.5, 0.9, 1, 1.3, 1.8, 2, 2.5, 3, 4, or 5 wt. %. In an exemplary aspect, a zircon composition can comprise a coarse zircon component having a median particle size of about 15 µm, a fine zircon component having a median particle size of about 2.5 µm, and a sintering aid comprising a zircon having a median particle size of about 1 µm. In another aspect, the composition comprises a titanium dioxide sintering aid. The use of and amount of a particular sintering aid can vary depending upon the nature of the composition and the method utilized for forming the composition into a desired shape. Sintering aids are commercially available (Sigma-Aldrich, St. Louis, Mo., USA) and known in the ceramic industry. One of skill in the art could readily select an appropriate sintering aid for a desired composition or ceramic article.

The zircon composition of the present invention can optionally further comprise other ceramics, such as, for example, xenotime (yttrium phosphate). Such ceramics can impart added strength and/or allow specific physical properties to be tailored as desired, but typically at substantially higher cost and complication of preparation and forming methods.

Forming and Firing a Ceramic Article

After mixing, a multi-modal zircon composition can be formed into a green body of any desired shape, such as an isopipe, by a suitable technique, such as, for example, slip casting, extrusion, isostatic pressing, and/or injection molding. A green body, as used herein, comprises a formed, but unfired ceramic material. Depending on the specific forming technique employed, liquids, solvents, and/or forming aids can optionally be mixed with the multi-modal zircon composition to facilitate the forming process. Such liquids, solvents, and/or forming aids, if present, can comprise any material suitable for facilitating the forming process. In one aspect, the liquid, solvent, and/or forming aid, if present, comprises at least one of methyl cellulose, water, glycerol, or a combination thereof. These liquids, solvents, and/or forming aids can be removed prior to or during the firing process or can remain in an article after firing. In one aspect, a slip casting technique is utilized to form a high liquid content mixture comprising the multi-modal zircon composition into a desired shape. In another aspect, an extrusion technique is utilized to form the multi-modal zircon composition into a desired shape. In yet another aspect, an isostatic pressing technique is utilized to form a dry or substantially dry multi-modal zircon composition into a desired shape. In an exemplary isostatic pressing technique, the pre-fired composition is optionally subjected to a tapping and/or vacuum step to achieve a high degree of compaction at ambient conditions, and then is isostatically pressed at about 18,000 psi for a period of from about 5 to about 20 minutes. Forming techniques are known in the ceramic industry and one of skill in the art could readily select an appropriate forming technique for a desired ceramic article.

Thereafter, the refractory can be prepared in accordance with techniques currently known in the art of with improved techniques which may be developed in the future. The refractory can be fired to sinter at least a portion of the zircon components of the composition. A firing step can comprise heating the formed green body at a time and temperature suitable to form a stable refractory ceramic body. In one aspect, the firing step can comprise heating a formed green body in an electrical furnace at a temperature of from about 1,400° C. to about 1,650° C. for a period of from about 1 to about 48 hours. In another aspect, the firing step can comprise heating a formed green body in an electrical furnace at a temperature of from about 1,400° C. to about 1,600° C. for a period of from about 2 to about 24 hours. The firing step can be performed in an air atmosphere, under an inert atmosphere, such as helium, or under vacuum. Firing techniques for refractory ceramics are known and one of skill in the art would readily be able to select and perform an appropriate firing step for a refractory ceramic composition of the present invention.

Fired Refractory Ceramic Body

A fired refractory ceramic body prepared from the composition and method of the present invention can exhibit low porosity, high bulk density, and high resistance to creep. Depending on the specific multi-modal zircon composition, degree of mixing, forming and firing technique, a refractory ceramic body prepared in accordance with the present invention can comprise a bulk density greater than about 2.3 g/cc, 3 g/cc, 4 g/cc, 4.5 g/cc, or more. The theoretical maximum bulk density for a zircon article is about 4.65 g/cc. Thus, it is possible to achieve bulk density values of, for example, 50%, 68%, 75%, 86%, 90%, or 96% of the theoretical maximum.

The strength of resulting refractory ceramic body and its resistance to creep and/or sag is dependent, in part, on the amount of pore space remaining in the refractory ceramic body. A refractory ceramic body having less pore space volume within its structure will generally exhibit a greater resistance to creep than a body with greater pore space volume. Zircon refractory ceramic bodies prepared in accordance with the present invention can have porosity values less than about 25%, less than about 12%, less than 10%, or less than about 3%.

The strength of a refractory ceramic body can be ascertained by determining the modulus of rupture (MOR) by, for example, ASTM C158. MOR refers to the amount of force needed to break a test sample and is usually expressed in pounds of force per square inch. The MOR of zircon refractory ceramic articles prepared in accordance with the present invention can be greater than about $10 \times 10^3$ psi, greater than about $15 \times 10^3$ psi, or greater than about $20 \times 10^3$ psi. Such high strength (MOR) provides increased creep resistance to an article, such as an isopipe, during operation.

The creep rate of a refractory ceramic body prepared in accordance with the present invention can be substantially lower than that for conventional zircon ceramics. While lower creep rates may be achievable through the use of other ceramic materials, such as yttrium phosphate, such materials are typically substantially more expensive and thus, not commercially feasible. In one aspect, the creep rate of a zircon refractory ceramic body prepared in accordance with the present invention can be less than about 50%, preferably less than about 25% of the creep rate of a conventional (isopressed) zircon isopipe.

Although several aspects of the present invention have been illustrated in the accompanying drawings and described in the detailed description, it should be understood that the invention is not limited to the aspects disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1—Preparation of Extruded Zircon Blocks

In a first example, a series of extruded zircon blocks were prepared and analyzed. For each experiment, coarse and fine particle size portions of zircon were prepared by ball-milling zircon (Ferro Corporation, Penn Yan, N.Y., USA) with yttria-stabilized zirconia grinding media. Fine particle size portions were further wet-ground in methanol to a desired median size (as illustrated in Table 1 below). Particle size distributions were determined using a Micromeritics® Microtrac Analyzer with zircon particles dispersed and sonicated in an alcohol solution. Porosity, pore volume, and density measurements were performed using a Micromeritics Autopore IV mercury intrusion porosimeter. Modulus of Rupture values (MOR) were determined on sample blocks, approximately 0.5×1.0× 6.4 cm, according to ASTM C158.

The coarse and fine particle size portions for each sample were then dry mixed, blended with 1-3 wt. % Methocel® hydroxypropyl methyl cellulose (Dow Chemical Company, Midland, Mich., USA), and mulled with water and 1-2 wt. % glycerol (Sigma-Aldrich, St. Louis, Mo., USA). The resulting material was then extruded and fired at 1,600° C.

TABLE 1

Binary Zircon Samples

| | Batch Composition | | | | | |
|---|---|---|---|---|---|---|
| | A | B | C | D | E | Control |
| Coarse:Fine Median Particle Size Ratio | 7:1 | 10:1 | 10:1 | 10:1 | 7:1 | N/A |
| Coarse:Fine Median Particle Sizes, μm | 7, 1 | 20, 2 | 20, 2 | 20, 2 | 7, 1 | 5 |

TABLE 1-continued

Binary Zircon Samples

| | Batch Composition | | | | | |
|---|---|---|---|---|---|---|
| | A | B | C | D | E | Control |
| Wt. % Particle Size, Coarse/Fine | 50/50 | 90/10 | 80/20 | 50/50 | 70/30 | N/A |
| Pore Volume, cc/g | 0.0049 | — | 0.0737 | — | 0.03 | — |
| % Porosity | 2 | — | 25.7 | — | 11.5 | 21.5 |
| Bulk Density, g/cc | 4.2 | 3.2 | 3.5 | 3.2 | 4 | 3.5 |
| Skeletal Density, g/cc | 4.3 | — | 4.7 | — | 4.5 | 4.5 |
| Modulus of Rupture, psi/10³ | 20.11 | 10 | — | — | 16.29 | — |

Figure 2:
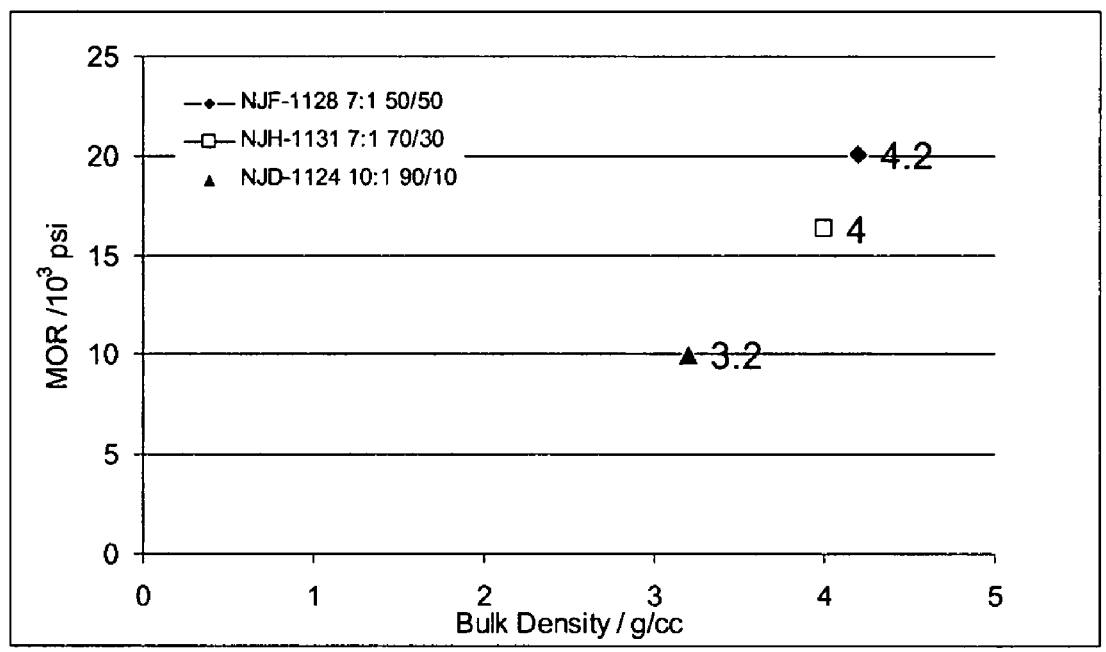
FIG. 2 is a graph illustrating the strength of a zircon composition as a function of bulk density.
Figure 3:
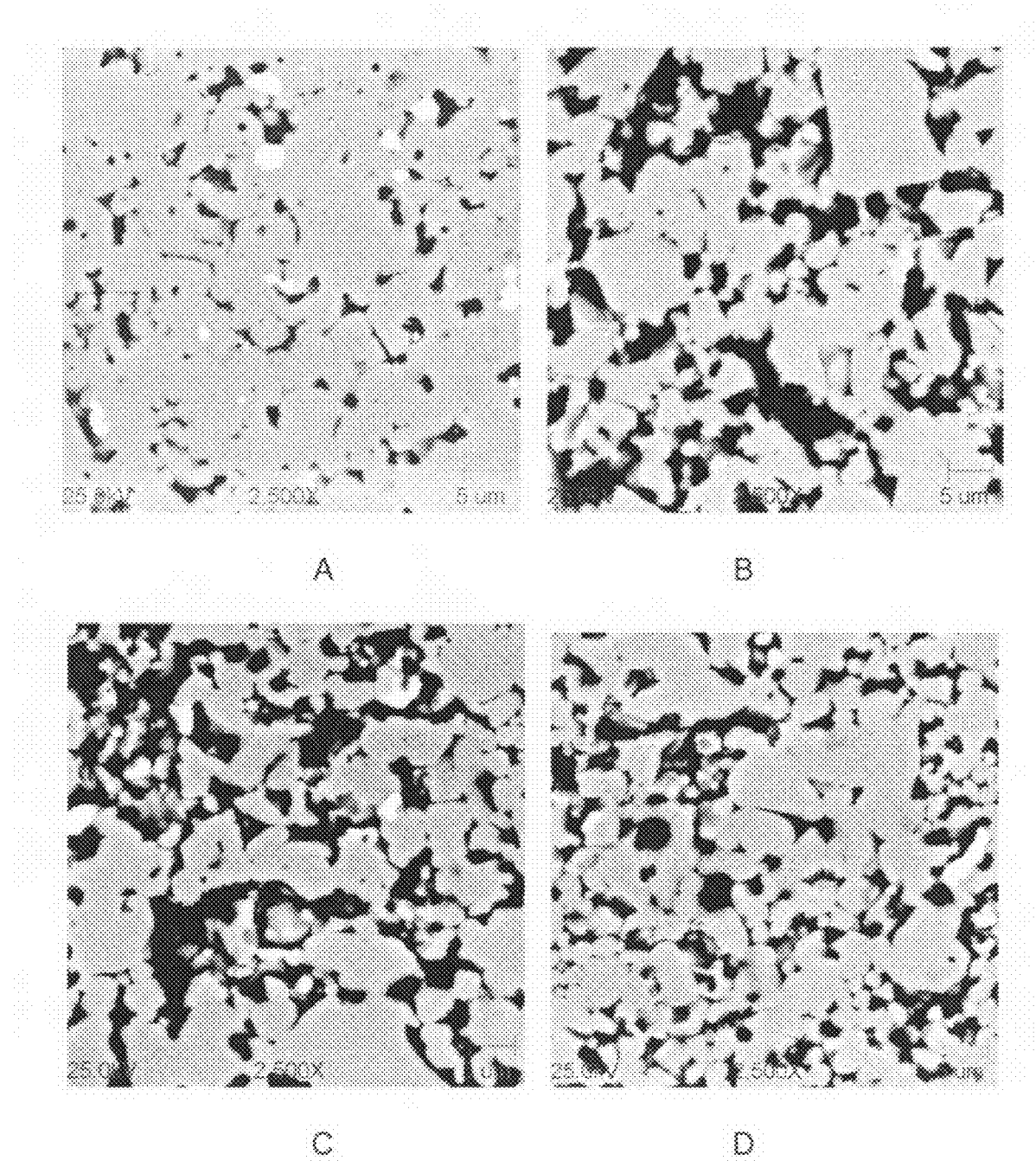
FIG. 3 depicts scanning electron microscope (SEM) images from various zircon compositions illustrating the effect of particle size on the fired microstructure of a zircon composition. The images represent zircon samples prepared from a zircon mixture having: (A) a 50 wt. %/50 wt. % mixture of a 7:1 particle size ratio; (B) a 90 wt. %/10 wt. % mixture of a 10:1 particle size ratio; (C) an 80 wt. %/20 wt. % mixture of a 10:1 particle size ratio; and (D) a 50 wt. %/50 wt. % mixture of a 10:1 particle size ratio.

The samples in Table 1 were prepared with varying proportions and particle sizes to demonstrate the effect of particle size on the bulk density of fired zircon articles. The control sample represents a commercially available zircon material having a median particle size of 5 μm. This control material did not have a binary particle size distribution. Sample A, having a particle size ratio of 7:1 at 50/50 wt. % ratio exhibited a bulk density of about 4.2 g/cc and a porosity of about 2%. Samples (A and B) having particle size ratios of 10:1 at 90/10 and 80/20 wt. % ratios exhibited bulk density values of 3.2 and 3.5, respectively. FIG. 2 illustrates the strength (Modulus of Rupture) of Samples A, B, and E at 20,000 psi. Scanning electron micrographs for Samples A, B, C, and D are depicted in FIG. 3. The micrographs illustrate the improved packing density attainable with the binary zircon compositions of the present invention.

Example 2—Determination of Creep Rate

In a second example, fired zircon blocks, such as those prepared in Example 1, were tested for creep for 100 hours at 1,180° C. under a pressure of 1,000 psi. Creep rates were normalized to that of a conventional zircon (isopressed) isopipe. The results, detailed in Table 2 below, demonstrate that a zircon article, prepared in accordance with the present invention can exhibit a creep rate four times lower than that of a commercial zircon isopipe.

TABLE 2

Normalized Creep Rate of Zircon Blocks

| Sample | Temp, ° C. | Creep Rate, (×10⁻⁶) in/hour | Normalized Creep Rate |
|---|---|---|---|
| F (Zircon 7:1 particle size ratio, 50/50 wt. % ratio) | 1,180 | 66 | 0.25 |
| G (Zircon 7:1 particle size ratio, 50/50 wt. % ratio) | 1,180 | 72 | 0.25 |
| J (Conventional Zircon Isopipe) | 1,187 | 256 | 1 |

Various modifications and variations can be made to the compositions, articles, devices, and methods described herein. Other aspects of the compositions, articles, devices, and methods described herein will be apparent from consideration of the specification and practice of the compositions, articles, devices, and methods disclosed herein. It is intended that the specification and examples be considered as exemplary.

What is claimed is:

1. An isostatically pressed green body for making an isopipe having a length of at least 1.5 meters made from a composition comprising zircon particles and a sintering aid at an amount from about 0.1 to about 5 wt %, wherein the zircon particles have a multi-modal particle size distribution comprising:
   a) greater than about 40 parts by weight of a coarse zircon component, and
   b) from about 30 parts to about 60 parts by weight of a fine zircon component;
   wherein the coarse zircon component has a median particle size of from greater than 3 μm to about 25 μm, and wherein the fine zircon component has a median particle size of 3 μm or less.

2. The green body of claim 1, wherein the coarse zircon component has a median particle size of from about 5 μm to about 25 μm.

3. The green body of claim 1, wherein the coarse zircon component has a median particle size of from about 5 μm to about 9 μm.

4. The green body of claim 1, wherein the fine zircon component has a median particle size of less than about 2.5 μm.

5. The green body of claim 1, wherein the ratio of the coarse zircon component median particle size to the fine zircon component median particle size is from about 5:1 to about 15:1.

6. The green body of claim 1, further comprising yttrium phosphate in the composition thereof.

7. The green body of claim 1, wherein the at least one sintering aid comprises:
   a) a zircon having a median particle size less than about 2 μm, wherein the zircon sintering aid can be the same or different from the fine zircon component; and/or
   b) an oxide of at least one of titanium, iron, calcium, yttrium, niobium, neodymium, or a combination thereof.

8. The green body of claim 1, wherein the coarse zircon component and the fine zircon component are substantially uniformly mixed.

9. The green body of claim 1, wherein the zircon particles have at least a ternary zircon particle size distribution.

10. The green body of claim 9, wherein the zircon particles having the at least a ternary zircon particle size distribution comprise:
    the coarse zircon component having a median particle size greater than about 15 μm,
    the fine zircon component having a median particle size of less than about 3 μm, and
    a medium zircon component having a median particle size between the median particle sizes of the coarse zircon component and the fine zircon component.

11. The green body of claim 10, wherein the coarse zircon component has a median particle size of from about 15 μm to about 25 μm, and wherein the fine zircon component has a median particle size of from about 0.1 μm to about 2 μm.

12. The green body of claim 1, wherein the zircon particles have a continuous particle size distribution.

* * * * *